United States Patent
Jordan et al.

(10) Patent No.: US 12,345,470 B2
(45) Date of Patent: Jul. 1, 2025

(54) PROCESS FOR REMOVING CO2 FROM A METHANE-CONTAINING GAS

(71) Applicant: HITACHI ZOSEN INOVA AG, Zürich (CH)

(72) Inventors: Uwe Jordan, Worpswede (DE); Gamuret Hack, Zürich (CH); Lukas Völlmy, Winterthur (CH)

(73) Assignee: HITACHI ZOSEN INOVA AG, Zurich (CH)

( * ) Notice: Subject to any disclaimer, the term of this patent is extended or adjusted under 35 U.S.C. 154(b) by 0 days.

(21) Appl. No.: 18/266,072

(22) PCT Filed: Jan. 27, 2022

(86) PCT No.: PCT/EP2022/051882
§ 371 (c)(1),
(2) Date: Jun. 8, 2023

(87) PCT Pub. No.: WO2022/162059
PCT Pub. Date: Aug. 4, 2022

(65) Prior Publication Data
US 2024/0044579 A1    Feb. 8, 2024

(30) Foreign Application Priority Data
Jan. 29, 2021   (EP) ..................... 21154198

(51) Int. Cl.
*F25J 3/06*     (2006.01)
*B01D 53/04*    (2006.01)
*B01D 53/047*   (2006.01)

(52) U.S. Cl.
CPC ........ *F25J 3/0635* (2013.01); *B01D 53/0462* (2013.01); *B01D 53/047* (2013.01);
(Continued)

(58) Field of Classification Search
CPC .............. B01D 53/0462; B01D 53/047; B01D 2256/245; B01D 2257/504;
(Continued)

(56) References Cited

U.S. PATENT DOCUMENTS 4,732,596 A * 3/1988 Nicholas .............. B01D 53/047
                                                   95/122
5,062,270 A   11/1991 Haut et al.
(Continued)

FOREIGN PATENT DOCUMENTS

WO   2006/106253 A2   10/2006
WO   2011/084512 A1   7/2011
(Continued)

OTHER PUBLICATIONS

May 2, 2022 International Search Report issued in International Patent Application No. PCT/EP2022/051882.
(Continued)

*Primary Examiner* — Frantz F Jules
*Assistant Examiner* — Webeshet Mengesha
(74) *Attorney, Agent, or Firm* — Oliff PLC

(57) ABSTRACT

A process for removing $CO_2$ from a methane-containing gas, having the steps of providing a methane-containing gas containing at least $CO_2$ as an impurity, cooling the gas to remove $CO_2$ from the methane-containing gas by freezing out same, and additionally reducing the $CO_2$ concentration of the gas using a pressure temperature swing adsorption apparatus (PTSA), whereby a methane-enriched product gas is obtained. At least a part of the product gas is then used as treatment gas and is passed through the PTSA for treatment of the PTSA, whereby $CO_2$ is absorbed by the treatment gas and is removed from the PTSA as a $CO_2$-enriched treatment gas. The treatment gas is then recycled and admixed with the methane containing gas.

15 Claims, 1 Drawing Sheet

(52) U.S. Cl.
CPC ......... *F25J 3/067* (2013.01); *B01D 2256/245* (2013.01); *B01D 2257/504* (2013.01); *B01D 2259/40052* (2013.01); *F25J 2205/40* (2013.01); *F25J 2205/64* (2013.01); *F25J 2245/02* (2013.01)

(58) Field of Classification Search
CPC ......... B01D 2259/40083; F25J 2205/64; F25J 2205/66; F25J 3/067; F25J 2210/04; C10L 2290/06; C10L 2290/10; C10L 2290/12
See application file for complete search history.

(56) References Cited

U.S. PATENT DOCUMENTS

| | | | |
|---|---|---|---|
| 2012/0180389 A1* | 7/2012 | Knaebel | B01D 53/75 48/127.3 |
| 2012/0222552 A1* | 9/2012 | Ravikovitch | C10L 3/105 95/97 |
| 2015/0033793 A1* | 2/2015 | Griffiths | F25J 3/0238 62/611 |
| 2018/0223205 A1* | 8/2018 | Mitariten | C10L 3/104 |
| 2019/0001263 A1* | 1/2019 | Prince | F25J 3/0209 |

FOREIGN PATENT DOCUMENTS

| | | |
|---|---|---|
| WO | 2016/126159 A2 | 8/2016 |
| WO | WO-2019030688 A1 * | 2/2019 |

OTHER PUBLICATIONS

May 2, 2022 Written Opinion issued in International Patent Application No. PCT/EP2022/051882.

* cited by examiner

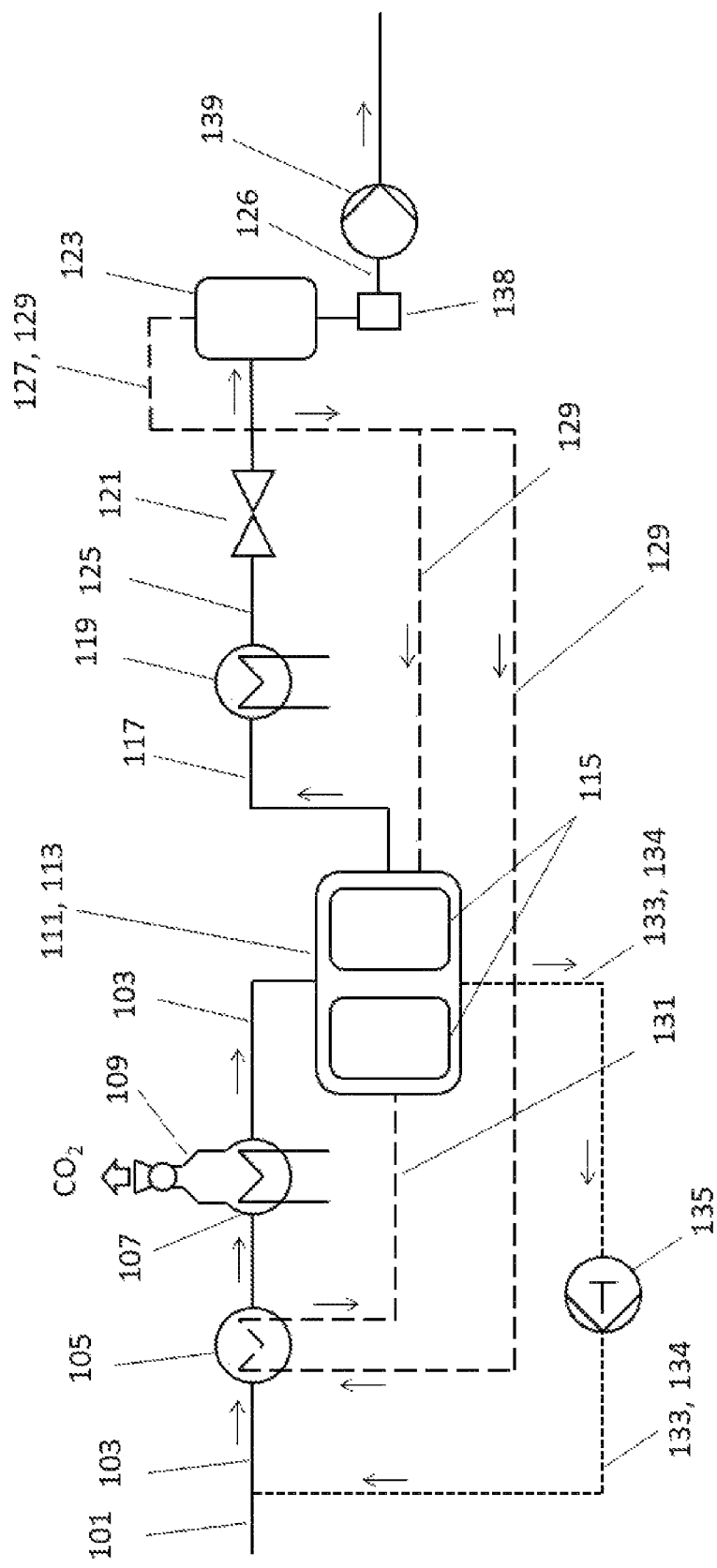

PROCESS FOR REMOVING CO2 FROM A METHANE-CONTAINING GAS

The present invention relates to a process and apparatus for removing $CO_2$ from a methane-containing gas.

As a result of global warming, $CO_2$-neutral energy sources are becoming increasingly important for modern society. A popular process for obtaining such an energy source is the fermentation of food waste in fermenters to produce biogas. Because foods such as fruits or vegetables bind $CO_2$ from the atmosphere, the biogas produced during the fermentation of this food and the methane it contains are climate-neutral.

In addition to methane, biogas usually also contains various impurities, in some cases appreciable amounts of $CO_2$. Since $CO_2$ is incombustible, its presence in the biogas impedes efficient combustion of the methane and reduces the energy density of the biogas. For this reason, biogas produced by fermentation is usually purified to increase the methane content. The methane-enriched product gas obtained after purification—often also called biomethane—can either be used directly for the purpose of energy generation, fed into the gas grid or liquefied with a view to intermediate storage or transport.

For liquefaction, the product gas is usually cooled considerably. In this process impurities contained in the product gas, especially also $CO_2$, have a disadvantageous effect: If there is a significant $CO_2$ concentration in the product gas this freezes out in the course of the cooling necessary for the liquefaction and can block valves of the liquefaction plant for example. In this regard a lowest possible $CO_2$ concentration in the product gas is not only desirable with regard to its use as an energy carrier, but also with regard to its liquefaction for storage or for transport. It has been shown that in the case of a liquefaction a $CO_2$ concentration in the product gas of below 215 ppm is ideal. However, such low $CO_2$ concentrations can only be achieved with the known processes—if at all—through the use of time- and cost-intensive purification processes.

Various separation processes and separation apparatuses are known for removal or reduction of $CO_2$ from biogas, such as amine scrubs, pressure swing adsorption ("PSA"), pressure thermal swing adsorption ("PTSA") or membranes. Many of these processes have the disadvantage that the involved separating apparatuses (membranes, adsorbers, filters) require complex reconditioning/regeneration or replacement since their separation performance decreases steadily without regeneration. In addition, multi-stage processes—i.e serially arranged separating apparatuses or separating steps are in series—are often necessary to achieve a significant $CO_2$ reduction in the product gas. Each separating step typically involves additional costs and loss of product gas (so-called "methane slip"). These problems are still present in current processes.

US 2019/0001263 A1 describes for example a process for producing biomethane, wherein the gas mixture to be purified is compressed in a first step and gaseous impurities (volatile organic compounds—VOC) are removed from the gas mixture using a PSA in a second step. Then, in a third step, a portion of the $CO_2$ and oxygen are separated from the gas mixture. Another $CO_2$ reduction is effected using a PTSA in a fourth step, while residual oxygen and nitrogen are removed by a cryogenic separation in a fifth step. At the end of this complex process, a methane-enriched, purified product gas, i.e. biomethane, is obtained. Regeneration of the PTSA is effected in known fashion by passing a methane-containing regeneration gas through the PTSA which is subsequently supplied to a downstream recovery plant for methane recovery. Despite the complex and cost-intensive purification steps the $CO_2$ reduction achieved using this process is insufficient with regard to an efficient liquefaction of the product gas. Another disadvantage is that a portion of the biomethane present in the gas mixture is lost in the course of the various treatment steps (methane slip), thus reducing the efficiency of the process with regard to the highest possible biomethane yield.

WO 2016/126159 A2 discloses a system for processing methane-containing gas having a methane content of at least 50% by volume and comprises a compression unit and a pretreatment unit with a membrane separator to reduce the $CO_2$ content to below 2% by volume and increase the methane content to above 85% by volume. The system further comprises a liquefaction unit and a decanting apparatus comprising a container in which a flash gas is produced.

U.S. Pat. No. 5,062,270 discloses a process for startup of a distillation column comprising a controlled freezing zone, in which process a $CO_2$-enriched gas stream having a preferred $CO_2$ content of 60-85% is produced.

The processes in the prior art have the disadvantage that the $CO_2$-content of the methane-containing gas cannot be reduced enough without likewise losing a considerable portion of the methane.

It is accordingly an object of the present invention to eliminate the above-described disadvantages of the prior art and to provide an improved process for removing $CO_2$ from a methane-containing gas mixture that allows efficient and effective reduction of the $CO_2$ content while simultaneously minimizing methane slip.

The object is achieved according to the invention described in the original claims, drawn to a process and drawn to an apparatus, respectively. Preferred embodiments of the invention are set out in the dependent claims.

In the process according to the invention a methane-containing gas containing at least $CO_2$ as an impurity is provided in a first step (step a).

In a second step $CO_2$ is separated from the gas by freezing-out (step b). To this end the methane-containing gas is cooled, preferably to or below −78.5° C., at atmospheric pressure.

In a third step the $CO_2$ concentration of the methane-containing gas is then further reduced in a pressure temperature swing adsorption (PTSA) apparatus to obtain a methane-enriched product gas (step c).

In a fourth step at least a portion of the product gas is then passed through the PTSA as treatment gas for treatment/regeneration of the PTSA, whereby $CO_2$ is absorbed by the treatment gas and removed with the latter (step d) from the PTSA.

In a fifth step the treatment gas laden with $CO_2$ in the course of the treatment of the PTSA is admixed with the methane-containing gas from the first step a) (step e).

In the context of the present invention methane-containing gas is defined as a gas comprising methane as a constituent. The methane-containing gas includes not only methane but also $CO_2$ and typically also other compounds, especially impurities, for example "volatile organic compounds" (VOC).

In the context of the present invention methane-enriched product gas is defined as a gas which has a higher methane concentration and a lower $CO_2$ concentration relative to the initially provided methane-containing gas.

In the context of the present invention treatment gas is defined as a gas which is separated from the product gas or from a gas based on the product gas and is passed through the PTSA for treatment of the PTSA. The treatment gas may be altered in terms of its temperature and/or its pressure before being passed through the PTSA, in particular may first be subjected to heating and/or decompression.

In the context of the present invention freezing-out is to be understood as meaning a process in which the temperature of the gas is cooled to below the pressure dependent sublimation point of $CO_2$. At atmospheric pressure, this is −78.5° C.

It has surprisingly been found that the use of product gas as treatment gas for treatment of the PTSA makes it possible to reduce the energy consumption of the PTSA. The need to use an external gas for treatment of the PTSA can specifically be avoided.

It has further surprisingly been found that the recycling of the treatment gas and the mixing thereof into the initially provided methane-containing gas makes it possible to enhance the efficiency of the process since the freezing-out step allows reliable and efficient separation of a large part of the $CO_2$ from the gas. The methane slip during freezing is simultaneously very low. The recycling of the $CO_2$-laden regeneration gas into the methane-containing gas provided in step a) before the freezing-out step b) relieves the PTSA in step c). This altogether allows the number of separating steps in step c) to be reduced and the methane slip of the process to be minimized.

The process according to the invention thus has the advantage over the prior art that the upstream freezing-out step in conjunction with the use and recycling of the treatment gas for and after treatment of the PTSA allows the latter to be operated in a markedly more cost effective, energy-efficient and environmentally friendly manner.

The methane-containing gas initially provided in step a) may in some cases be produced by fermentation, for example in biogas plants, and preferably comprises biogas, landfill gas and/or gas from pyrolysis of organic material. The gas may more preferably be of non-fermentative origin, for example in the form of natural gas, pit gas or coalbed gas. The methane-containing gas may also be provided by an upstream gas treatment plant.

As mentioned hereinabove, reduction of the $CO_2$ proportion and the accompanying increase in the methane proportion of the methane-containing gas provides a methane-enriched product gas. At least a portion of the latter is passed through the PTSA as treatment gas to regenerate the PTSA.

It is preferable when the product gas or at least a portion thereof is liquefied before separation of the treatment gas. Liquefaction of the product gas may be effected in known fashion by cooling and/or compression. Since increasing the pressure of the cold product gas is very complex the product gas is preferably liquefied by temperature reduction. The product gas is preferably cooled to −140° C. to −100° C., preferably −130° C. to −110° C. and particularly preferably −125° C. to −115° C. for liquefaction. These temperatures are preferred in conjunction with a pressure of 15 bar. The 15 bar corresponds to the preferred pressure of the product gas upon obtaining same after the $CO_2$ separation in the PTSA.

Liquefied product gas having a high proportion of methane may be stored almost pressurelessly at about −160° C. It is likeiwise possible to store the liquefied product gas at elevated pressure and elevated temperature.

After liquefaction, the liquefied methane-enriched product gas may be decompressed for easier transportation/simplified storage. In a preferred embodiment the liquefied methane-enriched product gas is decompressed to preferably 1 bar before diversion of a portion of the product gas for use as treatment gas. The decompressing of the liquefied product gas reduces the refrigeration demand of the plant and ensures that downstream storage and transport containers are not subjected to high pressures.

It is preferable when the decompressed liquefied product gas passes through a particulate filter which particularly preferably has a pore size of <10 μm and which removes solids from the decompressed liquefied product gas. The removal of residues from the preferably decompressed liquefied product gas increases its quality with regard to its use as an energy carrier and prevents the solids from settling in transport containers or valves and causing deposits therein.

During decompression at least a portion of the liquified product mixture is also regasified. In the context of the present invention this portion is referred to as "flash gas". The flash gas is thus preferably cooled, methane-enriched product gas which is preferably at atmospheric pressure (generally about 1 bar). In the context of the present invention this flash gas as treatment gas or as a portion of the treatment gas may be passed through the PTSA for treatment of the latter.

For the process according to the invention it is preferable to employ at least a portion of the flash gas formed in the decompression of the liquefied product gas as treatment gas to particularly enhance the efficiency of the process. However, it is likewise conceivable to separate the treatment gas immediately before liquefaction of the product gas, i.e. without preceding liquefaction and decompression to obtain a flash gas.

According to the invention $CO_2$ is removed from the PTSA in the course of the treatment of the PTSA. In the context of the present application the regeneration or treatment of the PTSA thus comprises a removal of $CO_2$. The need for treatment/regeneration of the PTSA results from the fact that the $CO_2$ removed or separated from the methane-containing gas using the PTSA typically accumulates in the PTSA. In the PTSA the methane-containing gas is passed through an adsorption medium/an adsorber in the flow direction, wherein the adsorption medium adsorbs the $CO_2$ and the methane-enriched product gas accumulates on the other (downstream) side of the adsorption medium. When the adsorber is saturated with $CO_2$ the adsorbed $CO_2$ must be detached from the adsorber to recondition, i.e. regenerate, the latter for further use. Several options for regeneration are known. These typically include reducing the pressure in the PTSA, heating the adsorption medium and/or passing a treatment gas through the adsorption medium in or counter to the flow direction of the gas to be purified. Combinations of the recited regeneration steps are also possible. Such a regeneration process of a PTSA is normally carried out at regular intervals. In practice this means that the PTSA either has several adsorbers/adsorber containers which alternately adsorb and are then regenerated or that the PTSA is not constantly in operation and the separation process is paused during the regeneration time of the adsorber.

Before being passed through the PTSA the treatment gas is particularly preferably decompressed and optionally heated since this favours release of $CO_2$ into the treatment gas.

In the context of the present invention heated treatment gas is defined as treatment gas which preferably has a temperature of −20° C. to 30° C., more preferably of −10° C. to 20° C. and particularly preferably of −5° C. to 15° C. and very particularly preferably of 0° C. to 10° C. to detach the $CO_2$ from the adsorber as efficiently as possible.

In a specific preferred embodiment of the method according to the invention the PTSA comprises an adsorber which has the preferably heated treatment gas passed through it in or counter to the flow direction of the methane-containing gas once the pressure in the PTSA has been reduced to the pressure of the treatment gas. The heated treatment gas detaches the adsorbed $CO_2$ from the adsorber which is thus regenerated. This treatment gas now laden with $CO_2$ is discharged from the PTSA, whereby the latter is once again ready to have the methane-containing gas passed through it and to remove $CO_2$ from the methane-containing gas by means of the regenerated adsorber.

As mentioned above and in accordance with the invention, once regeneration is complete the treatment gas is recycled to the PTSA and admixed with the methane-containing gas stream from the first step a) of the process according to the invention or combined therewith. Depending on the pressure of the methane-containing gas the treatment gas is preferably raised or lowered to the same pressure through the use of the compressor to allow efficient mixing of the two gas streams. The methane-containing gas in step a) is preferably admixed with a third of its volume (measured as the volume of supplied methane-containing gas per second) of treatment gas. In the context of the present invention a second step b) then comprises removal of $CO_2$ from the methane-containing gas—which contains the recycled treatment gas—by freezing-out of $CO_2$.

In the course of the freezing-out of the methane-containing gas it is preferably cooled to $-130°$ C. to $-80°$ C., more preferably $-120°$ C. to $-100°$ C., particularly preferably $-116°$ C. to $-110°$ C., at a pressure of 5 to 25 bar, particularly preferably of 10 to 20 bar and very particularly preferably of 14 to 17 bar ("bar" is presently always to be understood as meaning bar (a), i.e. absolute). In a preferred embodiment the methane-containing gas is cooled by contacting with a surface that is or has been cooled to the abovementioned temperature ranges. The $CO_2$ present in the methane-containing gas crystallizes out on this surface, thus forming a layer of solid $CO_2$—also known as dry ice—on the surface. The dry ice is typically removed from the surface at regular intervals, for example by scraping with a scraper, so that new $CO_2$ can crystallize out on the cooled surface.

The freezing-out step preferably reduces the $CO_2$ content of the methane-containing gas (including admixed treatment gas) to below 6000 ppm. According to the invention a further reduction in the $CO_2$ content of the methane-containing gas is achieved in the downstream PTSA. The freezing-out of $CO_2$ has the general advantage that a large amount of $CO_2$ is removable from the gas with relatively little complexity. The maintenance complexity of a corresponding freezing-out unit (cooling unit) is generally also relatively low compared to other separation apparatuses, for instance a PTSA. In addition to $CO_2$ other impurities may also be removed from the methane-containing gas in the course of the freezing-out. Another advantage is that no methane is lost in the freezing-out process, since methane does not condense on the surface at the abovementioned preferred temperatures. Freezing-out $CO_2$ thus allows the methane concentration in the methane-containing gas to be increased without methane losses.

Depending on whether, and in what concentration, further impurities condense on the surface together with the $CO_2$, the frozen-out $CO_2$ may subsequently be released to the environment or used as dry ice for cooling.

The PTSA preferably reduces the $CO_2$ concentration of the methane-containing gas to below 5200 ppm, preferably to below 830 ppm, more preferably to below 215 ppm, particularly preferably to below 100 ppm and very particularly preferably to below 50 ppm.

A low $CO_2$ concentration in the product gas is preferable especially with regard to liquefaction of the product gas, since this prevents a freezing-out of $CO_2$ in valves or pipe conduits. At atmospheric pressure it is very particularly preferably desirable for the product gas to have a $CO_2$ concentration of not more than 50 ppm since at these concentrations $CO_2$ remains dissolved in the liquefied product gas and does not crystallize out at temperatures below $-162°$ C. If the pressure in the product gas is higher than atmospheric pressure, the $CO_2$ concentration can also be higher.

A low $CO_2$ concentration in the product gas has additional advantages for the further use of the product gas: From a $CO_2$ concentration above about 215 ppm in the product gas it may be the case that decompression of the liquefied product gas causes $CO_2$ to crystallize out and that this requires removal—for example by sieving.

It is preferable when at least a portion of the product gas from the third step c) or at least a portion of the $CO_2$-laden treatment gas from the fourth step d) is used for cooling the methane-containing gas in the second step b) (freezing-out step). To this end the product gas or the treatment gas and the methane-containing gas are passed through a heat exchanger, preferably countercurrently.

The product gas from the third step c) (and thus also the portion separated from the product gas which is utilized as treatment gas) preferably has a temperature of $-162°$ C. to $-130°$ C., while the methane-containing gas from the first step a) preferably has a temperature of $0°$ C. to $40°$ C. The heat exchange in the heat exchanger heats the product gas/the treatment gas while simultaneously cooling the methane-containing gas. The product or treatment gas is preferably heated to a temperature of from $-20°$ C. to $30°$ C., more preferably from $-10°$ C. to $20°$ C., particularly preferably from $-5°$ C. to $15°$ C. and very particularly preferably from $0°$ C. to $10°$ C. while the methane-containing gas is preferably cooled to below $10°$ C., more preferably to below $0°$ C. and particularly preferably to below $-30°$ C. The cooled methane-containing gas from the heat exchanger is generally cooled further for the subsequent freezing-out (in the second step b)). The previous energy exchange between the treatment or product gas and the methane-containing gas makes it possible to reduce the energy demand for cooling the methane-containing gas, thus allowing the gas treatment to be operated more efficiently and more economically.

In a preferred embodiment the heated product gas from the heat exchanger is utilized as treatment gas for the removal of $CO_2$ from the PTSA. The heated product gas is optionally decompressed to a pressure of preferably 1 bar before being passed through the PTSA.

As explained hereinabove when using a PTSA the $CO_2$ is adsorbed by an adsorption medium/adsorber (typically zeolites or carbon molecular sieves). Once the adsorption medium is saturated it must be regenerated or replaced to make the PTSA functional again. As described above a regeneration of the adsorption medium may be achieved for example by passing the treatment gas therethrough in conjunction with heating and/or decompression of the adsorption medium. The regeneration process may be accelerated when the treatment gas flows through the adsorption medium counter to the flow direction of the methane-containing gas. The combination of heated and decompressed treatment gas which heats the adsorption medium to detach the $CO_2$ and simultaneously flows through the adsorption medium to transport the detached $CO_2$ away has proven very efficient for the regeneration of the PTSA. With a view to achieving the most energy-efficient possible process heating the treatment gas employs no external energy but rather heating is preferably effected—as described above—preferably by heat exchange between the "cold" product gas and the "warm" methane-containing gas in the heat exchanger. The heated product gas exiting the heat exchanger can then be sent on to the PTSA as treatment gas for regeneration of the PTSA.

As described hereinabove a heating of the adsorption medium also contributes to the regeneration of the PTSA. However, after regeneration of the adsorption medium using a heated treatment gas the regenerated adsorption medium must be cooled again to efficiently adsorb the $CO_2$ molecules from the methane-containing gas. This cooling may be effected using a portion of the product gas from step c): Upon its provision after the $CO_2$ removal in the PTSA the product gas preferably has a temperature of −130° C. to −80° C., particularly preferably of −120° C. to −100° C. and very particularly preferably −116° C. to −110° C. While a portion of the product gas is heated—preferably in the heat exchanger described hereinabove—to preferably −20° C. to 30° C., more preferably −10° C. to 20° C. and particularly preferably −5° C. to 10° C. and is subsequently passed through the adsorption medium as heated treatment gas a further portion of the product gas from step c) having its original temperature may be utilized to cool the adsorption medium of the PTSA back down to operating temperature after the regeneration. A cooling of the adsorption medium of the PTSA using an external refrigeration source can therefore be avoided, thus saving energy and costs.

The methane-containing gas is preferably compressed to 5 to 25 bar, particularly preferably to 10 to 20 bar and very particularly preferably to 14 to 17 bar before being supplied to the PTSA. Separation of $CO_2$ from the methane-containing gas in the PTSA is particularly efficient at the recited preferred pressure conditions.

In a preferred embodiment the methane-containing gas is supplied to the PTSA at a temperature of −130° C. to −80° C., particularly preferably of −120° C. to −100° C. and very particularly preferably of −116° C. to −110° C. The described temperatures are particularly suitable for an efficient separation of $CO_2$ from the methane-containing gas in the PTSA.

It is preferable when the methane-containing gas in the first step a) has a $CO_2$ concentration of not more than 60%, preferably of not more than 6% and particularly preferably of not more than 2.5%. The $CO_2$ concentration here refers to the point in time before admixture of the $CO_2$-laden treatment gas.

The process according to the invention makes it possible to purify methane-containing gas mixtures having a $CO_2$ proportion of up to 60%, albeit this is makes little sense economically. It is therefore sought to achieve the lowest possible $CO_2$ proportion to keep the purification complexity as low and as efficient as possible.

In a further aspect the invention relates to an apparatus for performing the above-described process for removing $CO_2$ from a methane-enriched gas. Said apparatus comprises a gas introduction conduit, a compression unit, at least one cooling unit for freezing out $CO_2$, a PTSA, a conduit for transporting away a methane-enriched product gas and a treatment gas conduit which connects the PTSA and the gas introduction conduit.

The apparatus according to the invention has the advantage over known apparatuses from the prior art that the treatment gas conduit, which connects the PTSA and the gas introduction conduit, may be utilized to recycle the $CO_2$ removed in the PTSA back into the gas introduction conduit to subsequently separate a large part of it by freezing-out. Such an apparatus is therefore very efficient in the removal of $CO_2$ from a methane-containing gas, thus making a methane-enriched product gas obtainable.

The invention will now be more particularly elucidated hereinbelow with reference to one of the accompanying exemplary embodiments. Purely schematically in each case:

FIG. 1 shows a schematic representation of a preferred embodiment of the process according to the invention for removing $CO_2$ from a methane-containing gas with a PTSA.

In the preferred embodiment of the process according to the invention shown schematically in FIG. 1, in a first step a) a methane-containing gas 103 containing at least $CO_2$ as an impurity is provided from a gas introduction conduit 101.

The methane-containing gas 103 is provided at a pressure of 15 bar and in a second step b) cooled to a temperature TG (gaseous temperature) of −32° C. in a first heat exchanger 105. The compressed and cooled methane-containing gas 103 is moreover further cooled in a second heat exchanger 107 to a temperature $T_F$ (freeze temperature) of −114° C., at which the $CO_2$ present in the methane-containing gas 103 freezes out on a surface (not shown) in a valve 109 of the heat exchanger and at regular intervals is scraped from said surface or removed in an alternative fashion. The freezing-out allows rapid removal of large amounts of $CO_2$ from the methane-containing gas 103, thus allowing the $CO_2$ concentration in the gas 103 to be reduced to below 2100 ppm. The methane-containing (and now $CO_2$-reduced) gas 103 is subsequently supplied to a PTSA 111. The PTSA 111 generally comprises a plurality of adsorber containers 115 (only two are shown here), which are operated in parallel, overlapping or mutually alternating fashion.

After the freezing-out of the $CO_2$ and the supplying of the methane-containing gas 103 to the PTSA 111 in a third step c) the residual $CO_2$ is removed from the methane-containing gas 103 by means of an adsorber 115 present in the PTSA 111, thus affording a methane-enriched product gas 117. After purification by the PTSA 111 the methane-enriched product gas 117 has a $CO_2$ content of preferably not more than 215 ppm. The methane-enriched product gas 117 is transported to a third heat exchanger 119 and liquefied by cooling to −120° C. Said gas is then passed via a valve 121 into a flash vessel 123 and decompressed to 1 bar, preferably atmospheric pressure, whereby the product gas is cooled to preferably −162° C. and a portion thereof is simultaneously regasified. In addition to decompressed liquefied product gas 126 a flash gas 127 is generally formed, i.e. a portion of the product gas 117 remains gaseous or a portion of the decompressed liquefied product gas 126 is regasified. In the process shown here the flash gas 127 is used as treatment gas 129 (dashed line). The treatment gas 129 from the flash vessel 123 has a $CO_2$ content of preferably below 215 ppm and a temperature of preferably −162° C. At least a portion of the treatment gas 129 (corresponding in its composition to the product gas 117) is initially recycled to the first heat exchanger 105 to cool the methane-containing gas 103. This heats the treatment gas 129 to preferably 0° C. The now-heated treatment gas 131 is then passed to the PTSA 111 where it heats and flows through the $CO_2$-saturated adsorbers 115 to detach the $CO_2$ from the adsorbers 115. A now $CO_2$-enriched treatment gas 133 (dotted line) is transported from the PTSA 111 to a compressor 135 where it is compressed to 15 bar—i.e. the starting pressure of the methane-containing gas 103.

The compressed and $CO_2$-enriched treatment gas 133 is subsequently transported through a treatment gas conduit 134 to the gas introduction conduit 101 and is there mixed with the methane-containing gas 103. Once the adsorbers 115 of the PTSA 113 have been reconditioned they are cooled back down to operating temperature to allow efficient adsorption of $CO_2$ from the methane-containing gas 103. Cooling of the adsorbers is effected either with product gas 117 or treatment gas 129 having a temperature of $-162°$ C.

The decompressed liquefied product gas 126 is passed through a particulate filter 138 having a pore size of <10 μm to remove solids in the product gas. The purified product gas is then supplied to the consumer using a pump 139. Since the two shown adsorbers 115 of the PTSA 111 can be operated in mutually alternating fashion, one adsorber 115 can be treated while the other adsorber 115 adsorbs $CO_2$ from the methane-containing gas 103. This makes it possible to ensure a constant purification process.

The invention claimed is:

1. A process for obtaining a methane-enriched product gas from a methane-containing gas comprising the steps of:
    a) providing a methane-containing gas containing at least $CO_2$ as an impurity and cooling the methane-containing gas in a first heat exchanger;
    b) further cooling the methane-containing gas of step a) to remove $CO_2$ from the methane-containing gas from step a) by freezing-out;
    c) further reducing the $CO_2$ concentration of the methane-containing gas from step b) using a pressure temperature swing adsorption apparatus (PTSA) to obtain a methane-enriched product gas;
    d) using at least a portion of the methane-enriched product gas from step c) as treatment gas which is passed through the PTSA for treatment of the PTSA, whereby $CO_2$ is absorbed by the treatment gas and removed from the PTSA as a $CO_2$-enriched treatment gas; and
    e) recycling the $CO_2$-enriched treatment gas that has been passed through the PTSA and admixing same with the methane-containing gas in step a),
    wherein at least a portion of the treatment gas is initially recycled to the first heat exchanger to cool the methane-containing gas in the first heat exchanger before being passed to the PTSA for regeneration.

2. The process as claimed in claim 1, wherein before step d) the methane-enriched product gas is entirely or at least partially liquefied by cooling to obtain a liquefied methane-enriched product gas.

3. The process as claimed in claim 2, wherein to achieve at least partial liquefaction the methane-enriched product gas is cooled to $-140°$ C. to $-100°$ C.

4. The process as claimed in claim 2, wherein the liquefied methane-enriched product gas is decompressed to obtain a flash gas and a decompressed liquefied methane-enriched product gas, wherein the flash gas is passed through the PTSA as treatment gas.

5. The process as claimed in claim 1, wherein in step b) the $CO_2$ concentration of the methane-containing gas is reduced to below 6000 ppm.

6. The process as claimed in claim 1, wherein in step c) the $CO_2$ concentration of the methane-enriched product gas is reduced to below 5200 ppm.

7. The process as claimed claim 1, wherein the treatment gas is decompressed and heated before it is passed through the PTSA in step d) as decompressed and optionally heated treatment gas.

8. The process as claimed in claim 7, wherein after being passed through the PTSA in step d) and before being recycled and admixed with the methane-containing gas in step e), the decompressed and optionally heated treatment gas is compressed to the pressure of the methane-containing gas.

9. The process as claimed in claim 1, wherein the treatment gas of step d) is used to cool the PTSA after regeneration thereof.

10. The process as claimed in claim 1, wherein the methane-containing gas is supplied to the PTSA at a pressure of 5-25 bar.

11. The process as claimed in claim 10, wherein the methane-containing gas is supplied to the PTSA at a temperature of $-130°$ C. to $-80°$ C.

12. The process as claimed in claim 1, wherein the methane-enriched product gas respectively the liquefied product gas is decompressed before diversion of the treatment gas.

13. The process as claimed in claim 1, wherein the methane-containing gas in step a) has a $CO_2$ concentration of not more than 60%.

14. The process as claimed in claim 4, wherein the decompressed liquefied methane-enriched product gas is passed through a particulate filter, which removes solids from the decompressed liquefied methane-enriched product gas.

15. The process as claimed in claim 1, wherein the further cooling in step b) is carried out in a second heat exchanger.

\* \* \* \* \*